United States Patent [19]
Werling

[11] 3,978,782
[45] Sept. 7, 1976

[54] HORS D'OEUVRES OVEN
[76] Inventor: John M. Werling, 209 E. 36th St., Apt. 3, Kansas City, Mo. 64111
[22] Filed: May 16, 1975
[21] Appl. No.: 578,134

[52] U.S. Cl.................................. 99/446; 99/447; 126/43; 126/265; 220/331
[51] Int. Cl.²............................................ A47J 27/00
[58] Field of Search ............ 99/446, 447, 400, 401; 126/19 M, 25 R, 25 A, 43, 44, 190, 261, 265, 268; 220/330, 331, 333

[56] References Cited
UNITED STATES PATENTS

| | | | |
|---|---|---|---|
| 1,973,175 | 9/1934 | McArdle | 99/400 X |
| 2,763,200 | 9/1956 | Kittler | 99/446 |
| 3,212,426 | 10/1965 | Lewus | 99/447 X |
| 3,361,126 | 1/1968 | Bloomfield | 126/261 |
| 3,490,642 | 1/1970 | Friedlander | 220/331 |
| 3,568,590 | 3/1971 | Grice | 99/447 X |
| 3,611,915 | 10/1971 | Glaser et al | 99/446 X |

*Primary Examiner*—Philip R. Coe
*Attorney, Agent, or Firm*—Fishburn, Gold & Litman

[57] ABSTRACT

A cooking device for preparing food items and includes an open top base member supported on a support structure and having a fuel holder therein for retaining a combustible fuel adapted to direct heat upwardly toward a heat shield and deflector supporting thereon a receptacle for receiving and retaining drippings from food items on a food support member positioned above the receptacle. The cooking device includes a cover and structure for moving the cover between a closed position and an open position permitting access to food items on the food support member. The device is particularly adapted to be relatively small and for preparing party foods, such as hot hors d'oeuvres.

11 Claims, 7 Drawing Figures

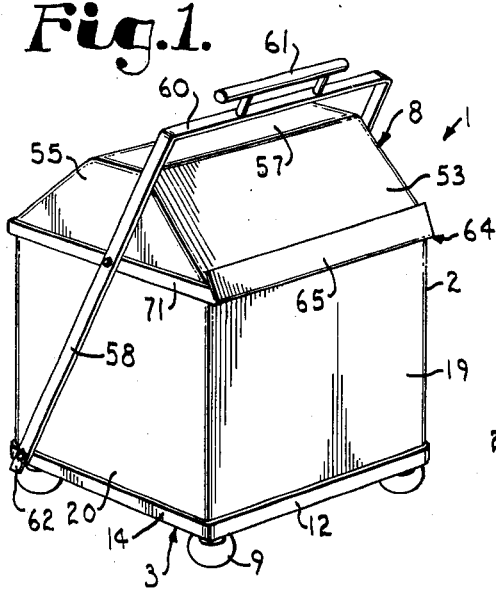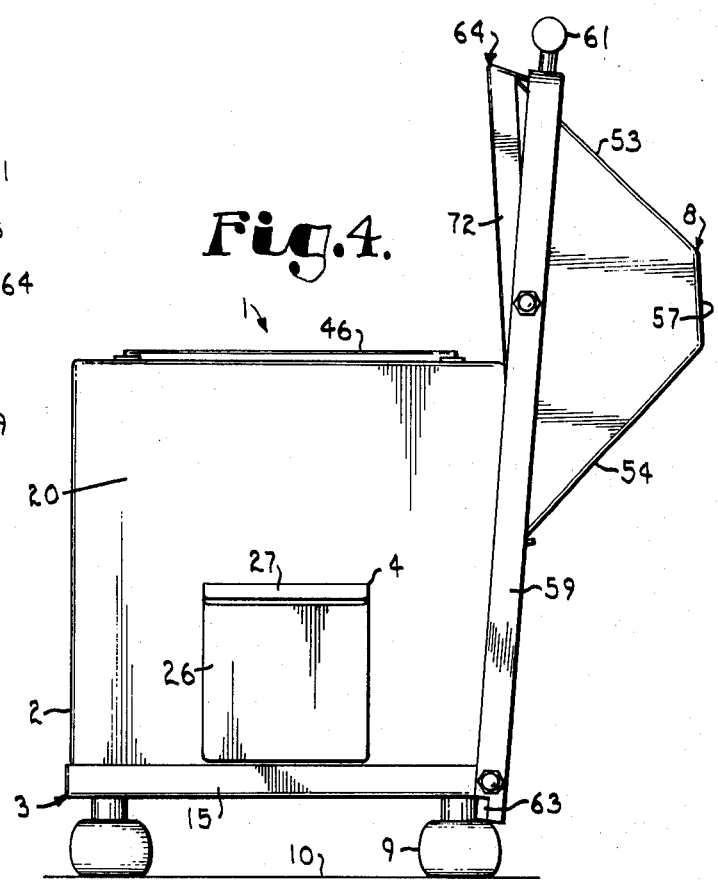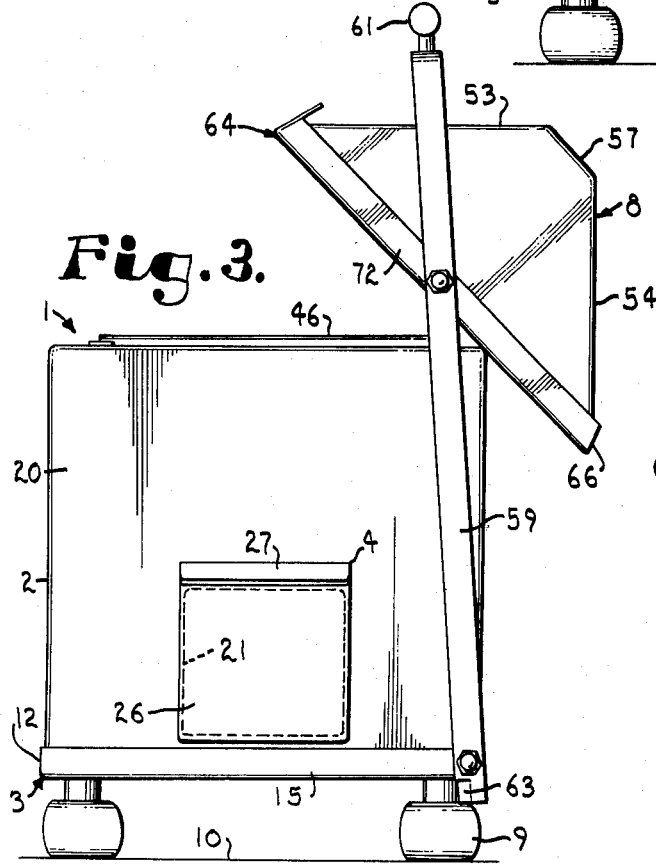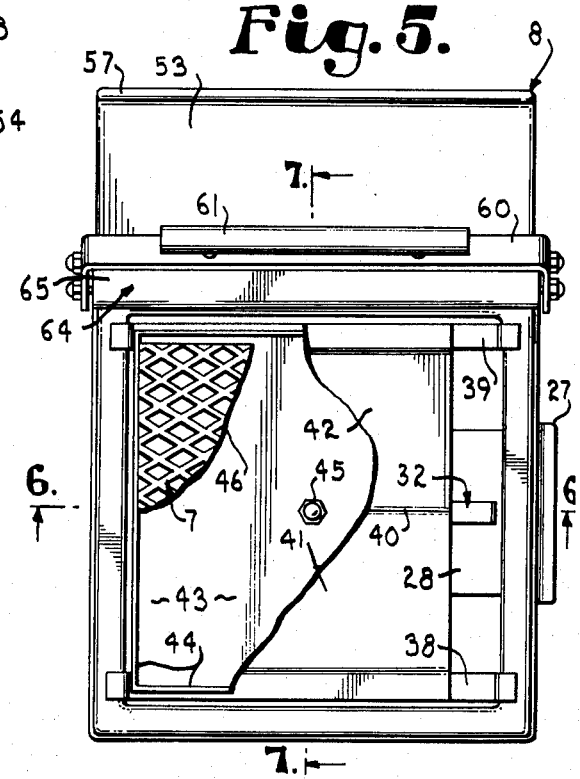

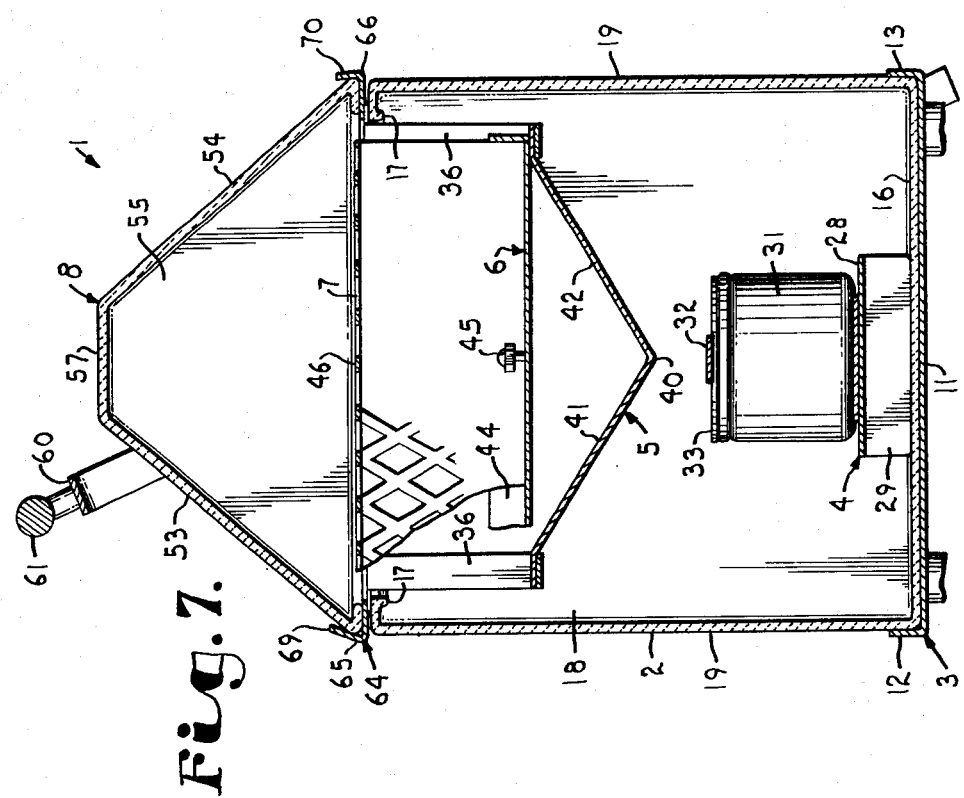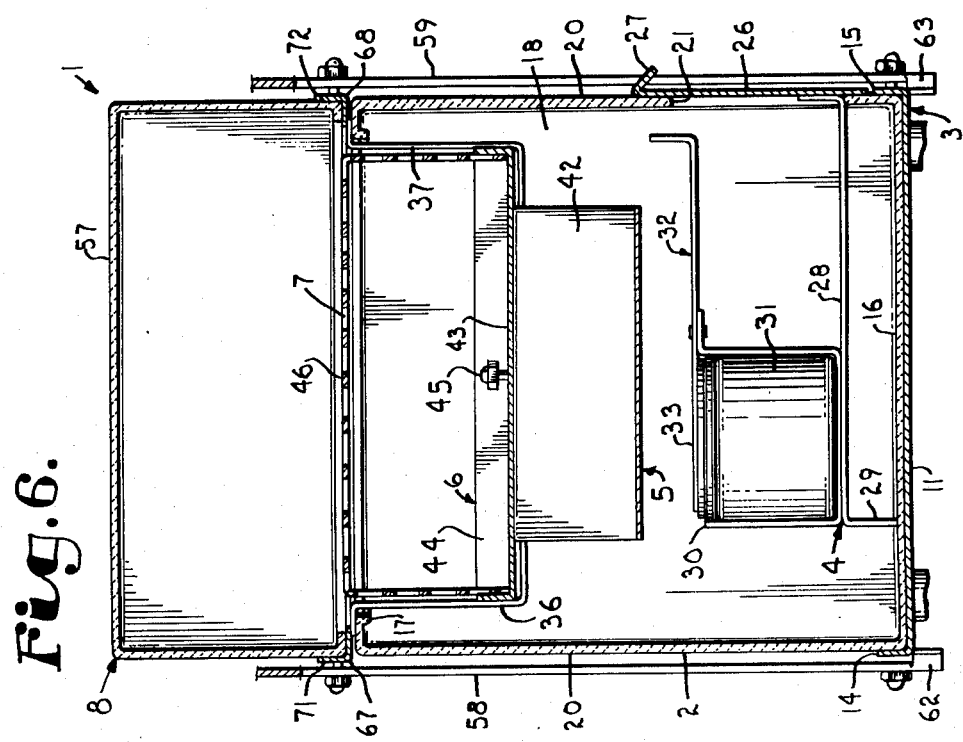

HORS D'OEUVRES OVEN

The present invention relates to cooking devices and more particularly to a cooking device for preparing party food items with an even cooking throughout.

The principal objects of the present invention are: to provide a cooking device adapted to prepare hot food items, such as party snacks, hors d'oeuvres, or the like; to provide such a cooking device which is adapted for use both indoors and outdoors; to provide such a cooking device having a cover and structure for moving the cover between a closed position and an open position permitting access to food items; to provide such a cooking device which permits preparation of food items without smoking and burning of food drippings as occurs in conventional grills; to provide such a cooking device requiring a minimum of attention whereby cooking substantially carefree; to provide such a cooking device having the component parts thereof easily and safely cleaned, such as in an automatic dishwasher; to provide such a cooking device having a heat shield or deflector positioned above a source of combustible fuel, such as in a container, and operative to direct heat into a cover and around food on a foraminous tray thereby providing even cooking of food items; to provide such a cooking device having a receptacle positioned above a heat shield and flame deflection and below the foraminous tray to receive and retain grease and other food drippings whereby the flames are deflected and does not directly heat the receptacle and thereby the food drippings are protected from excessive heat eliminating smoke and flame therefrom; and to provide such a cooking device which is attractive in appearance, durable in construction, economical to manufacture, easily cleaned, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the cooking device.

FIG. 1 is a perspective view of a cooking device embodying features of the present invention and shown with a cover in a closed position.

FIG. 3 is a side elevational view of the cooking device and showing the cover in a partially open position.

FIG. 4 is a side elevational view of the cooking device and showing the cover in a fully opened position.

FIG. 5 is a plan view of the cooking device with the cover shown in the open position.

FIG. 6 is a transverse sectional view taken on line 6—6, FIG. 5.

FIG. 7 is a longitudinal sectional view taken on line 7—7, FIG. 5.

Figure 2:
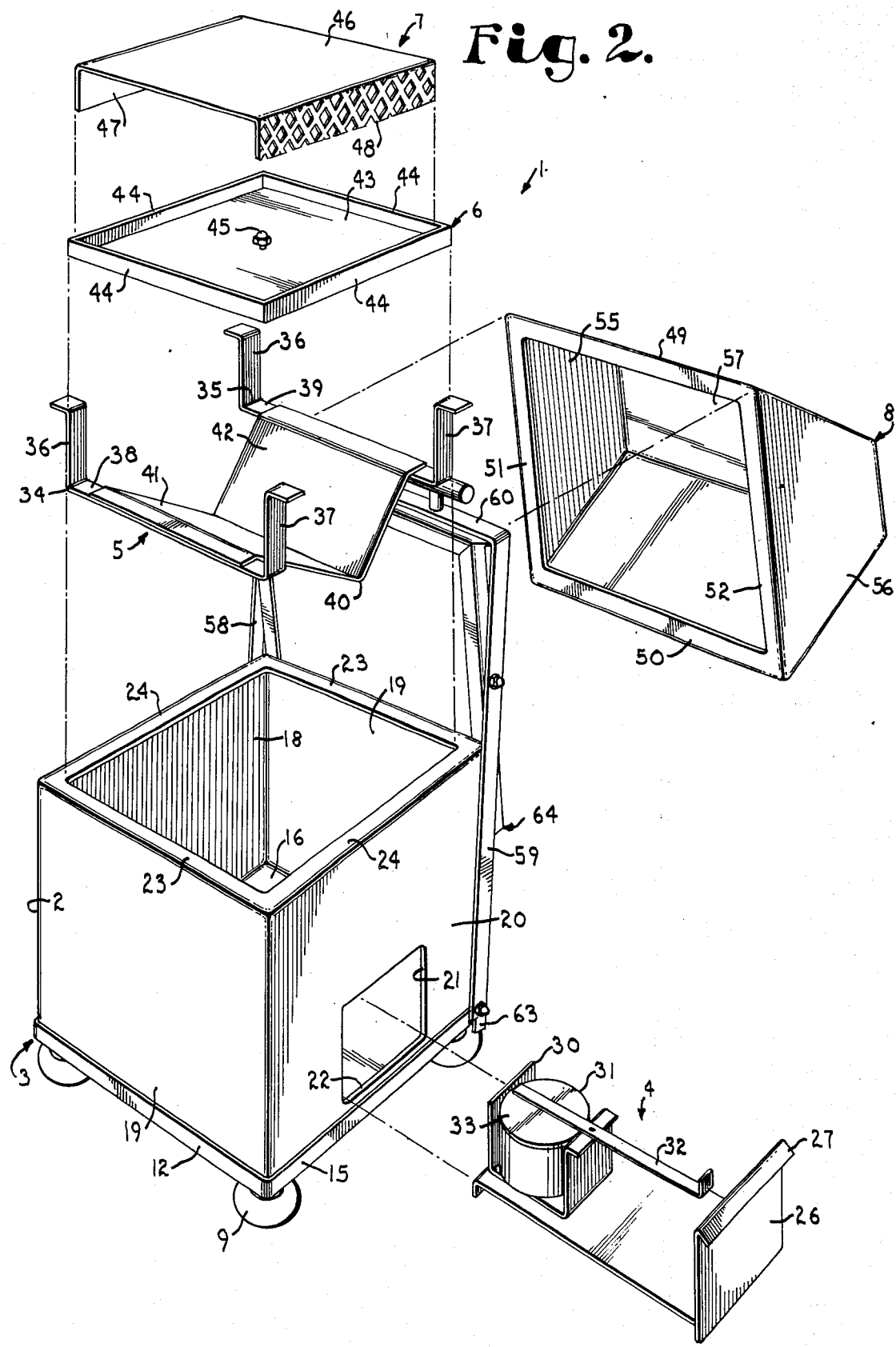
FIG. 2 is an exploded perspective view of the cooking device.

Referring more in detail to the drawings.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a cooking device for preparing food items. The cooking device 1 includes an open top housing or base member 2 supported on a support structure 3 and having a fuel holder 4 therein for retaining a combustible fuel adapted to direct heat upwardly toward a heat shield and deflector 5 supporting thereon a receptacle 6 for receiving and retaining drippings from food items supported on a food support 7 positioned above the receptacle 6. The cooking device 1 includes a cover 8 and structure for moving the cover 8 between a closed position and an open position permitting access to food items on the food support member 7.

The structure illustrated is particularly adapted for cooking party food items, such as hot hors d'oeuvres and the like, and may be used both indoors and outdoors.

The support structure 3 for the housing includes a plurality of suitable feet or legs 9 engaging a support surface 10. The support structure 3 includes means to support the housing 2, such as a frame or a base plate 11, mounted on the feet or legs 9 and the illustrated base plate 11 has front and rear edge flanges 12 and 13 respectively and end flanges 14 and 15 extending upwardly from respective peripheral edges of the base plate 11 to define a receptacle or frame to removably receive a base member or housing 2.

The base member or housing 2 is supported on the base plate 11 and is illustrated as a generally rectangular or square structure having a bottom wall 16 in supported engagement with the base plate 11. The base member or housing 2 includes walls extending upwardly from the bottom wall 16 and terminating in inwardly and downwardly turned flanges 17 to define an open top chamber 18. The illustrated chamber is defined by front and rear walls 19 and end walls 20. One of the end walls 20 has an aperture 21 therein to permit the fuel holder 4 to be installed in and removed from the chamber 18. The end wall 20 has an edge 22 defining the aperture 21 spaced upwardly from the bottom wall 16, for a purpose later described. The front and rear walls 19 have flat upper edges 23 and the end walls 20 have flat upper edges 24 defined by the flanges 17, for a purpose later described.

The fuel holder 4 is adapted to support a container of combustible fuel and position same within the base member 2 at bottom portion of the chamber 18. The illustrated fuel holder 4 includes an end member 26 spaced from the exterior surface of the one end wall 20 to permit air to pass through the aperture 21. The end member 26 preferably has means thereon to grasp during insertion of and removal of the fuel holder 4 from the base member or housing 2. The illustrated end member 26 has a handle or lip 27 extending outwardly therefrom to be grasped during removal of the fuel holder 4 from the base member 2.

The fuel holder 4 includes a support portion 28 secured to the end member 26 and having a depending edge portion 29 engaging the bottom wall 16 of the base member 2. The support portion 28 is positioned to be in supported engagement with the edge 22 defining the bottom of the aperture 21. A holder member 30 frictionally receives a container 31 of a suitable combustible fuel, such as STERNO or the like. A damper member 32 is pivotally or swingably mounted on the holder member 30 for movement of an end portion 33 thereof between a position in covering relation with a top of the container 31 thereby extinguishing a flame of the burning fuel and a position spaced from the top of the container 31 to thereby permit burning of the contents of the container 31.

The heat shield or deflector 5 is positioned above the fuel holder 4 to direct heat and flames upwardly and outwardly toward the upstanding walls of the base member or housing 2 and around the shield 5 and receptacle 6 whereby the receptacle 6 does not become hot enough to cause smoking or burning of food particles, grease, fats, and the like, falling thereinto from the food support member 7. The illustrated flame and heat shield or deflector 5 includes a pair of shield support members 34 and 35 positioned adjacent and spaced from the front and rear walls 19 of the base member 2. The support members 34 and 35 each include a pair of hangers 36 and 37 positioned adjacent and spaced from the end walls 20 ahd having respective end portions thereof engaging the upper edges 24 of the end walls 20. The shield support members 34 and 35 have support portions 38 and 39 respectively extending between theh hangers 36 and 37 thereof.

The heat shield 5 includes a shield member 40 preferably formed of sheet metal and having opposite ends thereof each in supported engagement with the support portions 38 and 39 of the support members 34 and 35. The shield member 40 thereby has ends and side edges thereof spaced from the front and rear walls 19 and the end walls 20 respectively. The shield or deflector member 40 has an apex or center line and first and second portions 41 and 42 inclined upwardly and outwardly therefrom to the shield support portions 38 and 39 respectively to thereby deflect heat upwardly and outwardly from the flame supplied by combustible fuel in the container 31 whereby heat is directed toward the food supporting member 7, as later described.

The receptacle 6 is positioned above the heat shield 5 and in the illustrated structure, the receptacle 6 is supported on the heat shield 5. The illustrated receptacle 6 is preferably formed of sheet metal and includes a planar member 43 having edge portions thereof in supported engagement with the support portions 38 and 39 of the shield support members 34 and 35. The planar member 43 has upstanding flanges 44 at each of the edges thereof to define the receptacle 6 which retains grease and other food drippings received therein. The receptacle 6 has a size in plan view which is less than the spacing between interior surfaces of the upstanding walls of the housing 2 thereby defining a respective space between the flanges 44 of the receptacle 6 and the adjacent interior surface of the housing walls for flow of heat around the receptacle 6. A handle or grasping member 45 extends upwardly from the planar member 43 and is preferably positioned in the center thereof for ease of removal of the receptacle 6 from the base member 2 for cleaning same.

The food support member 7 is positioned above the receptacle 6 and has a tray portion 46 with an upper surface or grid substantially aligned with the upper edges 23 and 24 of the upstanding walls of the base member 2. The tray portion 46 is a grill or grid structure and is preferably formed of a foraminous or reticulated member to permit heat to substantially surround food items placed thereon. The illustrated food support member 7 includes depending end or edge portions 47 and 48 having lower ends thereof supported on the planar member 43 of the receptacle 6. The end or edge portions 47 and 48 are also of a grid structure to permit heat to flow therethrough and under the tray portion 46. Heat then flows through the tray portion 46 and thereby around food items thereon.

The cover 8 is adapted to be positioned in covering relation with food support member 7 and thereby retain heat in the cooking device 1 and deflect same downwardly whereby the sides and upper portions of food items receive substantially the same amount of heat as the lower portions supported on the member 7 for substantially uniform cooking throughout. In the illustrated structure, the cover 8 includes front and rear edges 49 and 50 and end edges 51 and 52 positioned in covering relation with the upper edges 23 and 24 of the housing 2. Front and rear walls 53 and 54 extend from the front and rear edges 49 and 50 respectively and end walls 55 and 56 extend from the end edges 51 and 52. The end walls 55 and 56 are each aligned with the end walls 20 of the base member or housing 2. The illustrated front and rear walls 53 and 54 are positioned in upwardly converging relation and a top wall 57 extends between the upper edges thereof.

The cooking device 1 includes novel means mounted on the support structure 3 for moving the cover 8 between a closed position in covering relation with the upper edges 23 and 24 of the upstanding walls 19 and 20 of the housing or base member 2 and covering the food support member 7 and an open position spaced from the food support member 7 to permit access to food items thereon.

In the illustrated structure, the cover moving means includes a pair of elongated arms 58 and 59 having lower ends thereof pivotally mounted on the support structure 3, as on the end flanges 14 and 15 respectively extending upwardly from the base plate 11. A connecting portion 60 extends between the arms 58 and 59 at the other ends thereof. A handle 61 is mounted on the connecting portion 60 for ease in moving the arms 58 and 59. Abutment means or portions 62 and 63 are mounted on the arms 58 and 59 respectively and positioned to engage the base plate 11 of the support structure 3 to thereby limit the rearward movement of the arms 58 and 59 and thereby limit movement of the cover 8 beyond the rear wall 18 of the base member 2.

A cover supporting frame 64 is pivotally mounted on the arms 58 and 59. The frame 64 has front and rear frame members 65 and 66 and end frame members 67 and 68 adapted to receive the edges 49 to 52 inclusive of the cover 8. The frame 64 includes front and rear upstanding edge flanges 69 and 70 extending from the front and rear members 65 and 66 respectively. Upstanding end edge flanges 71 and 72 extend upwardly from the end members 67 and 68 respectively of the frame 64 to define a receptacle to receive the cover 8. The front edge flange 69 and the rear edge flange 70 are inclined in an upwardly converging relation, as view with the cover in a housing closing position, to retain the cover 8 therein. The rear edge flange 70 and the end edge flanges 71 and 72 are illustrated as being substantially the same height. The front end flange 69 has a greater height to retain the cover 8 in the frame 64, particularly when in the open position, as best seen in FIG. 4.

During movement of the cover 8 between the open and closed positions, the end frame members 67 and 68 are in engagement with the upper edge 23 of the rear wall 19 to thereby effect pivoting of the frame 64 during movement of the arms 58 and 59.

The pivotal connection of the arms 58 and 59 to the support structure 3, the pivotal mounting of the frame 64 on the arms 58 and 59, and the relative position of the end members 67 and 68 of the frame 64 and the upper edge 23 of the rear wall 19 are all arranged to cooperate so that the upper edge 23 of the rear wall 19 provides an edge or surface effecting movement of the cover 8 between the open and closed position. The pivotal mounting of the frame 64 on the arms 58 and 59 is arranged so that portions of the frame 64, such as forward ends of the end members 67 and 68, are in engagement with the arms 58 and 59 when the cover 8 is in the open position to thereby limit rearward movement of the frame 64 through an angle less than 90 degrees whereby the cover is retained in the frame 64.

In using a cooking device constructed as illustrated and described, the container 31 of combustible fuel, such as STERNO or the like, is positioned in the fuel holder 4 and the holder 4 is placed in the base member 2 by extending same through the aperture 21. The end member 26 is spaced from the adjacent end wall 20 to permit combustion air to enter the chamber 18. The damper member 32 is moved out of covering relation with the top of the container 31. The cover on the conntainer 31 is removed and fuel therein is ignited. The heat shield 5 is positioned in the housing or base member 2 with the ends of the hangers 36 and 37 of the shield support members 34 and 35 in engagement with the upper edges 24 of the end walls 20. The receptacle 6 is then supported on the support members 34 and 35. The food support member 7 is positioned in the base member 2 with the end portions 47 and 48 in supported engagement with the receptacle 6. Food items are then placed on the tray portion 46 and the cover 8 is moved to the closed position. The cover 8 is retained in the closed position during the desired time for cooking the respective food items. The cover 8 is then opened to permit access to the cooked food items.

The space between the end member 26 of the fuel holder 4 and the adjacent end wall 20 is sufficient to permit combustion air to flow into the housing 2 through the aperture 21. Flame from the fuel and heat therefrom is deflected by the shield member 40 outwardly and upwardly toward the upstanding walls 19 and 20 of the housing 2. Heat then flows between the edge flanges 44 of the receptacle 6 and the interior surface of the housing walls 19 and 20 and under the tray portion 46 of the food support member 7. Heat then flows through the tray portion 46 and around food items thereon and into the cover 8. The walls of the cover 8 are arranged to define a heat retaining chamber whereby the upper or top portion of the food items also receive heat for cooking thereof.

It is to be understood that while I have illustrated and described one form of my invention, it is not to be limited to the specific form or arrangement of parts herein described and shown.

What I claim and desire to secure by Letters Patent is:

1. A cooking device comprising:
   a. a housing having walls defining an open top chamber and including a bottom wall and front and rear walls and end walls extending upwardly from the bottom wall, one of said upwardly extending chamber defining walls having edges defining an aperture in said one chamber defining wall, said upwardly extending chamber defining walls each having an upper edge;
   b. a fuel holder extending through the aperture in said one chamber defining wall, said fuel holder including:
      1. a support portion positioned above said bottom wall of said housing and having one end portion engaging one of the aperture defining edges of said one chamber defining wall, said support portion having a depending portion extending from the other end portion of said support portion and in engagement with said bottom wall of said housing;
      2. means on said support portion for frictionally receiving a container of combustible fuel;
      3. a damper member having an enlarged end portion, said damper member being pivotally mounted on said means for receiving a container of combustible fuel whereby adjustment of said damper member relative to said means for receiving a container of combustible fuel will effect adjustment of said enlarged end portion of said damper member relative to the container of combustible fuel; and
      4. an end member mounted on the one end portion of said support portion of said fuel holder, said end member being positioned in exteriorly spaced relation with said one chamber defining wall and in covering relation with ther aperture in said one chamber defining wall;
   c. heat shield and deflector means positioned in said housing and above said fuel holder and having peripheral edges, said peripheral edges of said heat shield and deflector means each being spaced from a respective one of said adjacent upwardly extending chamber defining walls;
   d. a receptacle positioned in said housing and above said heat shield and deflector means and having peripheral edges, said peripheral edges of said receptacle each being spaced from a respective one of said adjacent upwardly extending chamber defining walls, said receptacle being characterized by being capable of receiving and retaining food drippings;
   e. a food supporting member positionend in said housing and above said receptacle, said food supporting member being a grid member and having a tray portion spaced from said receptacle for flow of heat under and through said tray portion; and
   f. a cover removably mounted on said housing for retaining heat adjacent said tray portion of said food supporting member.

2. A cooking device comprising:
   a. a support structure;
   b. a housing mounted on said support structure and having walls defining an open top chamber, certain of said chamber defining walls having an upper edge;
   c. means positioned in said housing for heating the chamber;
   d. means positioned in said housing and above said chamber heating means for supporting food items;
   e. means positioned in said housing and between said chamber heating means and said means for supporting food items for receiving and retaining food drippings;
   f. a cover for said housing;

g. a pair of elongated arms each having a lower end pivotally mounted on said support structure;

h. means pivotally mounted on said pairs of arms for supporting said cover and including portions engageable with the upper edge of one wall of said chamber defining walls during pivoting of said cover supporting means; and i. a handle connected to the other end of said pair of arms for moving said cover between a closed position and an open position.

3. A cooking device as set forth in claim 2 wherein:

a. said walls of said housing defining the open top chamber include a bottom wall and front and rear walls and end walls extending upwardly from the bottom wall; and b. heat shield means are positioned in said housing above said chamber heating means and below said means for receiving and retaining food drippings for deflecting heat toward the front and rear and end walls of said housing and around said means for receiving and retaining food drippings.

4. A cooking device as set forth in claim 3 wherein said heat shield means includes:

a. a pair of shield members each having a pair of hangers with an upper end in supported engagement with the upper edge of said certain walls of said chamber defining walls, said shield support members each having a support portion extending between the hangers thereof; and b. a shield member having opposite ends each in supported engagement with the support portion of a respective one of the shield support members, said shield member having portions included downwardly and inwardly from the shield support members to thereby deflect heat upwardly and outwardly from said chamber heating means whereby heat is directed into said cover.

5. A cooking device as set forth in claim 2 including abutment means on the lower end of at least one arm of said pair of arms and engageable with said support structure for limiting movement of said pair of arms beyond one of said chamber defining walls to thereby retain said cover in the open position.

6. A cooking device as set forth in claim 5 wherein:

a. said cover supporting means includes a frame;

b. said frame has portions removably receiving said cover;

c. said arms extend upwardly and rearwardly from said support structure when said cover is in the open position and said abutment means engage said support structure; and d. said frame is pivotally mounted on said arms and said frame is positioned relative to said arms so that a portion of said frame is in engagement with said arms when said cover is in the open position to limit movement of said frame whereby said cover is retained in said frame.

7. A cooking device as set forth in claim 6 wherein:

a. said cover has front and rear edges and end edges;

b. said walls of said housing defining the open top chamber include a bottom wall and front and rear walls and end walls extending upwardly from the bottom wall;

c. said cover supporting frame has front and rear members and end members each in covering relation with the upper edge of said front and rear walls and end walls respectively of said housing when said cover is in the closed position; and d. said front member of said cover supporting frame has means thereon for retaining said cover in said frame when said cover is in the open position.

8. A cooking device comprising:

a. a housing having walls defining an open top chamber and including a bottom wall and front and rear walls and end walls extending upwardly from the bottom wall, one of said upwardly extending chamber defining walls having edges defining an aperture in said one chamber defining wall, said upwardly extending chamber defining walls each having an upper edge;

b. a fuel holder extending through the aperture in said one chamber defining wall, said fuel holder having means for holding a supply of combustible fuel;

c. heat shield and deflector means positioned in said housing and above said fuel holder and having peripheral edges, said peripheral edges of said heat shield and deflector means being spaced from a respective one of said upwardly extending chamber defining walls, said heat shield and deflector means including:

1. a pair of shield support members each having a pair of hangers with an upper end, the upper end of each of said hanger members being capable of being in supported engagement with the upper edge of a respective one of said upwardly extending chamber defining walls, said shield support members each having a support portion extending between the hangers thereof; and 2. a shield member having opposite ends, each of said shield member opposite ends being in supported engagement with the support portion of a respective one of the shield support members, said shield member having portions thereof inclined downwardly and inwardly from the shield support members to thereby deflect heat upwardly from the shield support members to thereby deflect heat upwardly and outwardly from the supply of combustible fuel whereby heat is directed toward said food supporting member d. a receptacle positioned in said housing and above said heat shield and deflector means and having peripheral edges, said peripheral edges of said receptacle each being spaced from a respective one of said adjacent upwardly extending chamber defining walls, said receptacle being characterized by being capable of receiving and retaining food drippings, said receptacle being in supported engagement with the support portion of said shield support members;

e. a food supporting member positioned in said housing and above said receptacle, said food supporting member being a grid member and having a tray portion spaced from said receptacle for flow of heat under and through said tray portion, said food supporting member having portions depending from said tray portion and each being removably supported on said receptacle; and f. a cover removably mounted on said housing for retaining heat adjacent said tray portion of said food supporting member.

9. A cooking device comprising:

a. a housing having walls defining an open top chamber and including a bottom wall and front and rear walls and end walls extending upwardly from the bottom wall, one of said upwardly extending chamber defining walls having edges defining an aperture in said one chamber defining wall, said upwardly extending chamber defining walls each having an upper edge;

b. a fuel holder extending through the aperture in said one chamber defining wall, said fuel holder having means for holding a supply of combustible fuel;

c. heat shield and deflector means positioned in said housing and above said fuel holder and having peripheral edges, said peripheral edges of said heat shield and deflector means each being spaced from a respective one of said adjacent upwardly extending chamber defining walls;

d. a receptacle positioned in said housing and above said heat shield and deflector means and having peripheral edges, said peripheral edges of said receptacle each being spaced from a respective one of said adjacent upwardly extending chamber defining walls, said receptacle being characterized by being capable of receiving and retaining food drippings;

e. a food supporting member positioned in said housing and above said receptacle, said food supporting member being a grid member and having a tray portion spaced from the said receptacle for flow of heat under and through said tray portion;

f. a cover removably mounted on said housing for retaining heat adjacent said tray portion of said food supporting member;

g. a support structure having said housing mounted thereon; and h. means mounted on said support structure for moving said cover between a closed position and an open position spaced from said food supporting member to permit access to the food items, said means for moving said cover between an open position and a closed position comprising:

1. a pair of elongated arms each having a lower end, the lower end of each of said arms being pivotally mounted on said support structure;

2. a frame pivotally mounted on said pair of arms for removably supporting said cover, said frame having portions thereof engageable with the upper edge of one wall of said upwardly extending chamber defining walls of said housing during pivoting of said frame, said frame being positioned relative to said arms so that a portion of said frame is in engagement with said arms when said cover is in the open position to limit movement of said frame to an angle less than ninety degrees (90°) whereby said cover is retained in said frame;

3. a handle connected to the other end of said pair of arms; and 4. abutment means on the lower end of each of said arms and engageable with said support structure for limiting the movement of said arms rearwardly of the rear wall of said housing.

10. A cooking device as set forth in claim 9 wherein:

a. said cover has front and rear edges and end edges;

b. said cover has end walls each alignable with a respective one of said end walls of said housing and front and rear walls each extending from the front and rear walls each extending from the front and rear edges respectively of said cover;

c. the front and rear walls of said cover are positioned in converging relation;

d. said cover supporting frame has front and rear members and end members supporting the front and rear edges and end edges respectively of said cover; and e. said front member of said frame has means thereon for retaining said cover in said frame when said cover is in the open position.

11. A cooking device comprising:

a. a housing having walls defining an open top chamber and including a bottom wall and front and rear walls and end walls extending upwardly from the bottom wall, one of said upwardly extending chamber defining walls having edges defining an aperture in said one chamber defining wall, said upwardly extending chamber defining walls each having an upper edge;

b. a fuel holder extending through the aperture in said one chamber defining wall, said fuel holder having means for holding a supply of combustible fuel;

c. heat shield and deflector means positioned in said housing and above said fuel holder and having peripheral edges, said peripheral edges of said heat shield and deflector means each being spaced from a respective one of said adjacent upwardly extending chamber defining walls;

d. a receptacle positioned in said housing and above said heat shield and deflector means and having peripheral edges, said peripheral edges of said receptacle each being spaced from a respective one of said adjacent upwardly extending chamber defining walls, said receptacle being characterized by being capable of receiving and retaining food drippings;

e. a food supporting member positioned in said housing and above said receptacle, said food supporting member being a grid member and having a tray portion spaced from said receptacle for flow of heat under and through said tray portion;

f. a cover mounted on said housing for retaining heat adjacent said tray portion of said food supporting member;

g. a support structure having said housing mounted thereon; and h. means mounted on said support structure for moving said cover between a closed position and an open position spaced from said food supporting member to permit access to the food items, said means for moving said cover between an open position and a closed position comprising:

1. a pair of elongated arms each having a lower end, the lower end of each of said arms being pivotally mounted on said support structure;

2. a frame pivotally mounted on said pair of arms for supporting said cover, said frame having portions thereof engageable with the upper edge of one wall of said upwardly extending chamber defining walls of said housing during pivoting of said frame;

3. a handle connected to the other end of said pair of arms; and 4. abutment means on the lower end of each of said arms and engageable with said support structure for limiting the movement of said arms rearwardly of the rear wall of said housing.

* * * * *